United States Patent [19]
Curiel

[11] 4,453,810
[45] Jun. 12, 1984

[54] FILM TRANSPARENCY PROJECTOR

[75] Inventor: Yoram Curiel, Littleton, Colo.

[73] Assignee: Foto Resources, Lakewood, Colo.

[21] Appl. No.: 302,957

[22] Filed: Sep. 16, 1981

[51] Int. Cl.³ ............................................. G03B 21/16
[52] U.S. Cl. ...................................... 353/55; 353/57; 353/56
[58] Field of Search .................... 352/148; 350/1.2, 1.1, 350/1.5, 1.6, 1.7, 311, 315, 318; 362/6; 353/55-61, 84

[56] References Cited

U.S. PATENT DOCUMENTS

| | | | |
|---|---|---|---|
| 1,302,802 | 5/1919 | Jenkins . | |
| 1,434,268 | 10/1922 | Tillyer | 353/55 |
| 1,891,348 | 12/1932 | Ellinger et al. | 350/1.2 |
| 1,957,279 | 5/1934 | Linke . | |
| 2,395,561 | 2/1946 | Osterberg et al. | 353/55 |
| 2,444,976 | 7/1948 | Brown | 360/1.6 |
| 2,461,140 | 2/1949 | Capstaff | 353/55 X |
| 2,464,887 | 3/1949 | Osterberg et al. . | |
| 2,552,184 | 5/1951 | Koch . | |
| 2,668,478 | 2/1954 | Schroder | 353/55 X |
| 3,632,198 | 1/1972 | Poffer | 353/60 |
| 3,944,352 | 3/1976 | Morgan | 353/55 |

Primary Examiner—Harry N. Haroian
Attorney, Agent, or Firm—Buell, Blenko, Ziesenheim & Beck

[57] ABSTRACT

A film transparency projector including a housing, a source of illumination for projecting light through a film transparency, a lens for focusing the image on a desired surface, an infrared filter for resisting passage of infrared radiation from the source of illumination to the film transparency, an ultraviolet filter for resisting passage of ultraviolet radiation from the source of illumination to the film transparency the ultraviolet filter including a filter member composed of an acrylic material having an ultraviolet absorbing additive and a vent for exhausting air from the housing. The infrared filter may consist of two angularly disposed spaced infrared filters. The ultraviolet absorbing material may be selected from the group consisting of benzophenones, benzotriazoles, substituted acrylonitriles and phenol-nickel complexes. The acrylic material may include methyl methacrylate.

13 Claims, 2 Drawing Figures

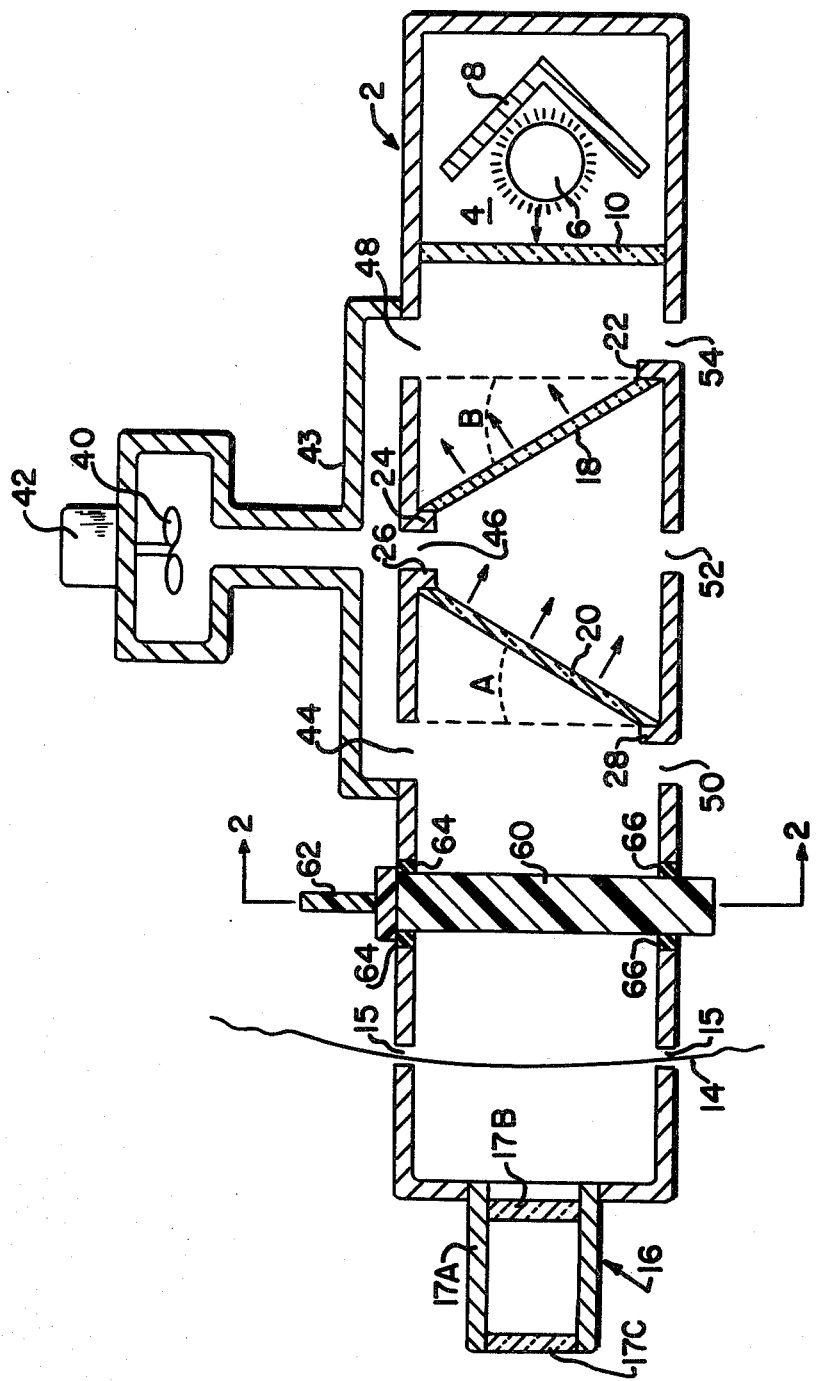

FILM TRANSPARENCY PROJECTOR

BACKGROUND OF THE INVENTION

1. Field of the Invention

The present invention relates to film transparency projectors and, more specifically, relates to such projectors having integral means adapted to resist undesired exposure of the film transparency to ultraviolet and infrared radiation originating with the projector's illumination source.

2. Description of the Prior Art

The term "film transparency projector" as used herein shall mean a projector adapted to project an image contained on a film transparency and shall include, but not be limited to motion picture projectors, slide projectors, microfiche and other images made visible to the human eye through illumination.

One of the problems encountered with display of color film transparencies such as slides or motion pictures by means of the use of a projector has been the fact that exposure to ultraviolet or infrared radiation can have a damaging, fading effect on the film. The problem is particularly acute in respect of exposure to ultraviolet radiation which can cause permanent fading of the image on the film transparency.

It has been known to employ a foraminous plate composed of a high thermal conductivity material such as a copper screen to reduce heating of a motion picture during display. See U.S. Pat. No. 1,302,802.

U.S. Pat. No. 1,957,279 discloses illumination of infrared radiation from the radiation of a light source by passing the same through a transparent or transluscent sheet or layer containing a suitable compound for selective absorption. In one embodiment a reflecting layer is combined with a heat absorbing layer.

U.S. Pat. No. 2,464,887 discloses a heat screen for use in projectors wherein the heat screen is relatively thin, of meniscus shape and composed of an alumina-phosphate type of glass. The meniscus shape is said to resist breakage due to thermal expansion and contraction as compared with flat heat screen lenses. A heat absorbing glass is disclosed in U.S. Pat. No. 3,944,352.

U.S. Pat. No. 2,552,184, while alluding to the need to control ultraviolet radiation, teaches no solution to the problem and emphasizes what is said to be the more important problem of controlling infrared radiation. In general, infrared radiation is controlled by employing an interference mirror type of filter which permits passage of the infrared radiation therethrough and reflects the remainder of the visible spectrum. It also acknowledges the teaching of transmitting visible light and reflecting infrared radiation.

There remains a very real and substantial need for a film transparency projector which will effectively resist fading of the film transparency resulting from ultraviolet and infrared radiation.

SUMMARY OF THE INVENTION

The present invention has met the above described need by providing a film transparency projector which includes a housing, illumination means, lens means, infrared filter means for resisting passage of infrared radiation from said illumination means to said film transparency, ultraviolet filter means for resisting passage of ultraviolet radiation from said illumination means to the film transparency and vent means for exhausting air from the housing. The ultraviolet filter means may include a filter member composed of an acrylic material, such as methyl methacrylate, having an ultraviolet absorbing additive added thereto.

In a preferred embodiment of the invention the ultraviolet filter is disposable and readily removable from the projector without taking apart the housing. Another preferred feature includes a pair of generally plate-like infrared filters which reflects the infrared radiation rearwardly and either downwardly or upwardly.

It is an object of the present invention to provide a film transparency projector which will effectively resist undesired fading of a color film transparency resulting from exposure of the film transparency to either ultraviolet or infrared radiation during projection.

It is a further object of the present invention to provide a unique ultraviolet filter which may advantageously be readily removable and disposable.

It is another object of the present invention to provide such a projector which has efficient ventilating means for minimizing the build-up of heat within the projector housing.

These and other objects of the invention will be more fully understood from the following description of the invention on reference to the illustrations appended hereto.

BRIEF DESCRIPTION OF THE DRAWINGS

FIG. 1 is a partially schematic cross-sectional illustration of a form of projector of the present invention showing a film strip in projecting position.

FIG. 2 shows a cross-sectional illustration of the ultraviolet filter taken through 2—2 of FIG. 1.

BRIEF DESCRIPTION OF THE PREFERRED EMBODIMENTS

Referring now more specifically to FIG. 1, there is shown a projector having a housing 2 which includes an illumination chamber 4 containing light source 6, which may take the form of a suitable incandescent bulb or carbon arc light source, for example, and an associated reflector member 8 which is so positioned as to direct a major portion of the light in a direction indicated by the arrow shown to the left of the light source 6. While the reflector member 8, in the form shown has a pair of angularly disposed legs, it may be of other shapes, such as curved or concave, if desired. For convenience of reference the direction in which the arrow is pointing will be referred to herein as the axial direction with respect to the projector and generally will be considered to be coaxial with the lens assembly 16.

A heat shield 10, which in the form illustrated is composed of glass, serves to resist convective heat transfer from the light source 6 to the adjacent portions of the housing interior.

A film transparency 14, which in the form shown is a segment of a continuous movie film is shown passing through a pair of aligned openings 15 in housing 2. In projecting a color film transparency image the light from the projector passes through the film and subsequently through lens 16 which focuses the image on the desired surface.

The lens assembly, in the form shown, consists of a tubular housing 17A which secures space lenses 17B, 17C in spaced relationship. Suitable adjustment means (not shown) for focusing may be provided.

The infrared filter means, in the form shown are interposed between the film 14 and the heat shield 10. It is preferably interposed between the heat shield 10 and ultraviolet filter 60 in order to minimize exposure of the ultraviolet filter 60 to infrared radiation. In the form illustrated, the infrared filter means consists of a pair of angularly disposed plate like reflecting or dicroic filters 18, 20. Filter 18 is adapted to reflect the infrared radiation generally rearwardly and upwardly, while filter 20 is adapted to reflect the infrared radiation generally rearwardly and downwardly. Filter 18 makes an angle B with respect to a plane oriented generally perpendicularly with respect to the longitudinal axis of the projector and filter 20 makes an angle A with respect to a plane passing through the longitudinal axis of the projector. In a preferred embodiment the angles A and B will be about 25° to 60°. It is generally undesirable to reflect the infrared radiation directly back toward the light source 6 because this creates additional heat at and adjacent the light source and this will result in such heat being projected again toward the film. In securing the filters 18, 20 in the desired position it may be desirable to provide a series of detents 22, 24, 26, 28 generally inwardly projecting from the housing 2 which may assume a generally cylindrical or rectangular cross-sectional configuration, if desired.

The arrows illustrated adjacent the filters 18, 20 indicate the direction in which infrared radiation reflected by the filter will be directed.

Referring to FIGS. 1 and 2, the ventilating system for maximizing flow of air out of the projector housing interior in order to resist undesired excessive heating will now be considered. A series of inlet openings 44, 46, 48 are provided at the upper portion of the housing 2 and cooperate with a series of generally opposed openings 50, 52, 54 to provide a series of channels of air flow on opposite sides and between the filter members 18, 20. While for clarity of illustration they have not been shown, it is preferred to provide light traps to resist escape of light while permitting escape of air through openings 50, 52, 54. These may take the form of boxes inserted into the openings having several generally horizontal baffle plates shielding light against escape from housing 2 or any other suitable barriers. In the embodiment illustrated in order to enhance the efficiency of air flow through this region a fan 40 powered by a suitable motor 42 is connected with inlet openings 44, 46, 48 by means of duct header 43 in order to establish positive ventilation. If desired, the fan may be placed remote from housing 2 and connected to header 43 by suitable ducts.

Considering now the ultraviolet radiation filter means there is shown a filter member 60 which is provided with a handle 62 and is received within an opening in the housing in such fashion as to permit ready removal without disassembly of the housing. In order to insure effective engagement between the filter 60 and the housing 2 it is preferred to put a pair of upper resilient retainer members 64 which may advantageously be composed of rubber or metal and a lower similar series 66 intermediate the metal housing 2 and the disc-like ultraviolet filter 60. If desired, the filter may be more permanently secured to the housing where a disposable filter will not be used or disposal will be so infrequent that such more intimate connection to the projector will not be objectionable.

As used herein, the term "acrylic material" shall mean methyl methacrylate or other acrylic plastics including but not limited to those sold under the trade designations "Plexiglas" and "Lucite". It is preferred in the present invention that the ultraviolet filter be composed of an acrylic material to which has been added an ultraviolet ray absorbing component. This absorbing material may advantageously be uniformly distributed through the acrylic material when the material is in a molten state. Among the materials suitable for inclusion in the filter are materials selected from the group consisting of benzophenones, benzotriazoles, substituted acrylonitriles and phenolnickel complexes. One specific suitable material is that sold under the trade designation "Tinovin P". In general, this filter will provide an effective barrier to passage of ultraviolet radiation therethrough by permitting the chemical components which have been added to the acrylic material to convert the radiant ultraviolet ray frequency energy into molecular motion which dissipates such energy. After a period of use the efficiency of the conversion action may deteriorate rendering it desirable to replace the ultraviolet filter element 60. In general, it will be preferred that the acrylic material have a thickness of about $\frac{1}{4}''$ to $\frac{1}{2}''$.

It will be appreciated, therefore, that the present invention provides an effective means of resisting undesired rading of color film transparencies resulting from excess exposure to ultraviolet or infrared radiation. All of this is accomplished in an efficient manner which combines with the preferred positive ventilation and angular reflection of the infrared radiation so as provide an effective barrier to ultraviolet and infrared radiation. In a preferred embodiment the ultraviolet filter is an acrylic material which contains an additive which absorbs ultraviolet radiation. The ultraviolet filter may advantageously be removably secured to the projector housing to facilitate use of a disposable filter member.

Whereas particular embodiments of the invention have been described above for purposes of illustration it will be appreciated by those skilled in the art that numerous variations of the details may be made without departing from the invention as described in the appended claims.

I claim:
1. A film transparency projector comprising:
a housing,
illumination means for projecting light through a film transparency,
lens means disposed in spaced relationship with respect to said illumination means,
infrared filter means for resisting passage of infrared radiation from said illumination means to said film transparency,
ultraviolet filter means for resisting passage of ultraviolet radiation from said illumination means to said film transparency,
said ultraviolet filter means including a filter member composed of an acrylic material having an ultraviolet absorbing additive for converting ultraviolet ray energy emitted by said illumination means into molecular motion which serves to dissipate such energy,
said ultraviolet filter means being removable from said housing without disassembly of said housing,
said infrared filter means being spaced from said ultraviolet filter means,
said infrared filter means having at least one generally plate-like infrared reflective filter member disposed generally angularly with respect to a plane oriented perpendicularly with respect to the longitudinal axis of said projector, whereby infrared radia- tion from said illumination means will be reflected angularly rearwardly, a transparent head resisting member interposed between said illumination means and said infrared filter means, said infrared filter means being disposed between said heat resisting member and said ultraviolet filter means, said housing having openings for permitting a film transparency to be disposed in projecting position; and vent means for exhausting air from said housing whereby said heat resisting member will resist exposure of said filters and said film transparency to heat, said infrared filter will resist exposure of said ultraviolet filter means and said film transparency to infrared radiation and said utltraviolet filter means will resist exposure of said film transparency to ultraviolet radiation.

2. The film transparency projector of claim 1 including said ultraviolet absorbing additive selected from the group consisting of benzophenones, benzotriazoles, substituted acrylonitriles and phenol-nickel complexes.

3. The film transparency projector of claim 2 wherein said acrylic material includes methyl methacrylate.

4. The filter transparency projector of claim 1 including said vent means including a plurality of inlet openings and a plurality of exhaust openings.

5. The film transparency projector of claim 4 including fan means for establishing flow of air into said inlet openings and out of said exhaust openings.

6. The filter transparency projector of claim 5 including said infrared filter means having two said angularly disposed plate-like filter members, one of said plate like filter members being disposed so as to reflect said infrared radiation generally upwardly and rearwardly and the other said plate like filter member being so disposed so as to reflect said infrared radiation generally downwardly and rearwardly.

7. The film transparency projector of claim 6 including each said plate-like filter forming an angle of about 25° to 60° with respect to said perpendicular plane.

8. The film transparency projector of claim 7 including said infrared filter means and said ultraviolet filter means being disposed between said illumination means and said lens means.

9. The film transparency projector of claim 8 including said infrared filter means being dicroic filters.

10. The filter transparency projector of claim 1 including said ultraviolet filter means being a generally disc-like member, said housing having an opening for receiving said disc-like member, and said disc-like member disposed within said 11. The film transparency projector of claim 10 including said disc-like member having engaging means for removing said member from said housing opening.

12. The film transparency projector of claim 11 including resilient means interposed between said opening defining portion of said housing and said disc-like member for effecting resilient retention of said disc-like member, whereby said disc like member will be demountably secured within said housing.

13. The film transparency projector of claim 1 including said lens means disposed on the opposite side of said film transparency receiving opening from said ultraviolet filter means.

* * * * *

UNITED STATES PATENT AND TRADEMARK OFFICE
CERTIFICATE OF CORRECTION

PATENT NO. : 4,453,810
DATED : June 12, 1984
INVENTOR(S) : Yoram Curiel

It is certified that error appears in the above-identified patent and that said Letters Patent is hereby corrected as shown below:

In the References, Patent 1,957,279, after "Linke" add --106/36.2--

In the References, Patent 2,444,976, change "360/1.6" to --350/1.6--

Column 1, line 31, change "illumination" to --elimination--

Column 4, line 9, change "phenolnickel" to --phenol-nickel--

Column 4, line 23, change "rading" to --fading--

Column 5, Claim 1, line 3, change "head" to --heat--

Column 6, Claim 10, line 19, after "said" add --opening.--

Signed and Sealed this

Ninth Day of October 1984

[SEAL]

Attest:

Attesting Officer

GERALD J. MOSSINGHOFF

Commissioner of Patents and Trademarks